US008700510B2

(12) United States Patent
Fraher et al.

(10) Patent No.: US 8,700,510 B2
(45) Date of Patent: Apr. 15, 2014

(54) REDIRECTING OR RETURNING INTERNATIONAL CREDIT TRANSFERS

(75) Inventors: Richard Fraher, Marietta, GA (US); Elizabeth McQuerry, Atlanta, GA (US)

(73) Assignee: Federal Reserve Bank of Atlanta, Atlanta, CA (US)

( * ) Notice: Subject to any disclaimer, the term of this patent is extended or adjusted under 35 U.S.C. 154(b) by 109 days.

(21) Appl. No.: 13/371,104

(22) Filed: Feb. 10, 2012

(65) Prior Publication Data

US 2012/0209774 A1 Aug. 16, 2012

Related U.S. Application Data

(60) Provisional application No. 61/441,707, filed on Feb. 11, 2011.

(51) Int. Cl.
*G06Q 40/00* (2012.01)
(52) U.S. Cl.
USPC .............................................. 705/35; 705/44
(58) Field of Classification Search
USPC ..................................................... 705/35–44
See application file for complete search history.

(56) References Cited

U.S. PATENT DOCUMENTS

| 4,270,042 | A | 5/1981 | Case |
| 4,727,243 | A | 2/1988 | Savar |
| 4,823,264 | A | 4/1989 | Deming |
| 5,121,945 | A | 6/1992 | Thomson et al. |
| 5,175,682 | A | 12/1992 | Higashiyama et al. |
| 5,448,043 | A | 9/1995 | Nakano et al. |
| 5,532,464 | A | 7/1996 | Josephson et al. |
| 5,691,524 | A | 11/1997 | Josephson |
| 5,717,868 | A | 2/1998 | James |
| 5,742,819 | A | 4/1998 | Caccavale |
| 5,761,510 | A | 6/1998 | Smith et al. |
| 5,783,808 | A | 7/1998 | Josephson |
| 5,787,402 | A | 7/1998 | Potter et al. |
| 5,790,778 | A | 8/1998 | Bush et al. |
| 5,794,234 | A | 8/1998 | Church et al. |
| 5,825,003 | A | 10/1998 | Jennings et al. |
| 5,848,400 | A | 12/1998 | Chang |
| 5,852,812 | A | 12/1998 | Reeder |
| 5,903,878 | A | 5/1999 | Talati et al. |

(Continued)

FOREIGN PATENT DOCUMENTS

WO   WO 0030053   5/2000

OTHER PUBLICATIONS

U.S. Appl. No. 60/416,663, filed Oct. 7, 2002, Yusin.

(Continued)

*Primary Examiner* — Thu Thao Havan
(74) *Attorney, Agent, or Firm* — King & Spalding LLP

(57) ABSTRACT

Redirecting or returning international credit transfers is described. In one embodiment a system for redirecting or returning international credits is described including a gateway operator that receives a credit transfer from a foreign originator, compares routing and account numbers of the credit transfer with a predetermined table of routing and account numbers, and forwards the credit transfer based on the comparison of the routing and account numbers with the predetermined table, an Automated Clearing House (ACH) that presents the credit transfer to a Receiving Depository Financial Institution (RDFI) for clearing and settlement, and a wire transfer service that presents the credit transfer to the RDFI for clearing and settlement. In another embodiment a method for redirecting or returning international credits is described.

20 Claims, 4 Drawing Sheets

(56) References Cited

U.S. PATENT DOCUMENTS

| | | | |
|---|---|---|---|
| 5,940,813 A | 8/1999 | Hutchings |
| 5,946,669 A | 8/1999 | Polk |
| 5,956,700 A | 9/1999 | Landry |
| 5,963,647 A | 10/1999 | Downing et al. |
| 5,963,648 A | 10/1999 | Rosen |
| 5,978,485 A | 11/1999 | Rosen |
| 6,026,379 A | 2/2000 | Haller et al. |
| 6,032,133 A | 2/2000 | Hilt et al. |
| 6,061,665 A | 5/2000 | Bahreman |
| 6,076,064 A | 6/2000 | Rose |
| 6,076,074 A | 6/2000 | Cotton et al. |
| 6,098,053 A | 8/2000 | Slater |
| 6,119,107 A | 9/2000 | Polk |
| 6,141,651 A | 10/2000 | Riley et al. |
| 6,173,272 B1 | 1/2001 | Thomas et al. |
| 6,205,433 B1 | 3/2001 | Boesch et al. |
| 6,216,115 B1 | 4/2001 | Barrameda et al. |
| 6,243,689 B1 | 6/2001 | Norton |
| 6,246,999 B1 | 6/2001 | Riley et al. |
| 6,269,345 B1 | 7/2001 | Riboud |
| 6,304,860 B1 | 10/2001 | Martin, Jr. et al. |
| 6,317,745 B1 | 11/2001 | Thomas et al. |
| 6,408,284 B1 | 6/2002 | Hilt et al. |
| 6,598,028 B1 | 7/2003 | Sullivan et al. |
| 6,615,258 B1 | 9/2003 | Barry |
| 6,629,081 B1 | 9/2003 | Cornelius et al. |
| 6,721,715 B2 | 4/2004 | Nemzow |
| 6,754,640 B2 | 6/2004 | Bozeman |
| 6,829,590 B1 | 12/2004 | Greener et al. |
| 6,856,970 B1 | 2/2005 | Campbell et al. |
| 6,868,408 B1 | 3/2005 | Rosen |
| 6,873,972 B1 | 3/2005 | Marcial et al. |
| 6,892,184 B1 | 5/2005 | Komem |
| 7,269,575 B1 * | 9/2007 | Concannon et al. ............ 705/39 |
| 7,330,835 B2 | 2/2008 | Deggendorf |
| 7,333,953 B1 | 2/2008 | Banaugh et al. |
| 2001/0034682 A1 | 10/2001 | Knight et al. |
| 2001/0034702 A1 | 10/2001 | Mockett et al. |
| 2002/0016769 A1 | 2/2002 | Barbara et al. |
| 2002/0029194 A1 | 3/2002 | Lewis et al. |
| 2002/0032642 A1 | 3/2002 | Chichilnisky |
| 2002/0035561 A1 | 3/2002 | Archer et al. |
| 2002/0038305 A1 | 3/2002 | Bahl et al. |
| 2002/0055904 A1 | 5/2002 | Mon |
| 2002/0072942 A1 | 6/2002 | Kuykendall et al. |
| 2002/0077971 A1 | 6/2002 | Allred |
| 2002/0082962 A1 | 6/2002 | Farris et al. |
| 2002/0087455 A1 | 7/2002 | Tsagarakis et al. |
| 2002/0099656 A1 | 7/2002 | Poh Wong |
| 2002/0120537 A1 | 8/2002 | Morea |
| 2002/0120846 A1 | 8/2002 | Stewart et al. |
| 2002/0161692 A1 | 10/2002 | Loh et al. |
| 2002/0161707 A1 | 10/2002 | Cole |
| 2002/0185529 A1 | 12/2002 | Cooper et al. |
| 2003/0018554 A1 | 1/2003 | Lyftogt et al. |
| 2003/0024979 A1 | 2/2003 | Hansen et al. |
| 2003/0033228 A1 | 2/2003 | Bosworth-Davies et al. |
| 2003/0050892 A1 | 3/2003 | Clynes |
| 2003/0055756 A1 | 3/2003 | Allan |
| 2003/0065594 A1 | 4/2003 | Murphy |
| 2003/0065941 A1 | 4/2003 | Ballard |
| 2003/0070080 A1 | 4/2003 | Rosen |
| 2003/0105710 A1 | 6/2003 | Barbara et al. |
| 2003/0126094 A1 | 7/2003 | Fisher et al. |
| 2003/0144942 A1 | 7/2003 | Sobek |
| 2003/0158811 A1 | 8/2003 | Sanders et al. |
| 2003/0167223 A1 | 9/2003 | Pledereder et al. |
| 2003/0167237 A1 | 9/2003 | Degen et al. |
| 2003/0177087 A1 | 9/2003 | Lawrence |
| 2003/0182227 A1 | 9/2003 | Guzman |
| 2003/0187783 A1 | 10/2003 | Arthus et al. |
| 2003/0187792 A1 | 10/2003 | Hansen et al. |
| 2003/0208439 A1 | 11/2003 | Rast |
| 2003/0208440 A1 | 11/2003 | Harada et al. |
| 2003/0208445 A1 | 11/2003 | Compiano |
| 2003/0220878 A1 | 11/2003 | Degen et al. |
| 2003/0229586 A1 | 12/2003 | Repak |
| 2003/0233319 A1 | 12/2003 | Lawrence |
| 2004/0002914 A1 | 1/2004 | Munro |
| 2004/0006533 A1 | 1/2004 | Lawrence |
| 2004/0024709 A1 | 2/2004 | Yu et al. |
| 2004/0030621 A1 | 2/2004 | Cobb |
| 2004/0034594 A1 | 2/2004 | Thomas et al. |
| 2004/0078328 A1 | 4/2004 | Talbert et al. |
| 2004/0078332 A1 | 4/2004 | Ferguson et al. |
| 2004/0083167 A1 | 4/2004 | Knight et al. |
| 2004/0093305 A1 | 5/2004 | Knight et al. |
| 2004/0109596 A1 | 6/2004 | Doran |
| 2004/0117299 A1 | 6/2004 | Algiene et al. |
| 2004/0128240 A1 | 7/2004 | Yusin |
| 2004/0138973 A1 | 7/2004 | Keis et al. |
| 2004/0143621 A1 | 7/2004 | Fredrickson et al. |
| 2004/0148255 A1 | 7/2004 | Beck et al. |
| 2004/0153403 A1 | 8/2004 | Sadre |
| 2004/0199463 A1 | 10/2004 | Deggendorf |
| 2004/0205011 A1 | 10/2004 | Northington et al. |
| 2004/0236646 A1 | 11/2004 | Wu et al. |
| 2005/0004872 A1 | 1/2005 | Gavin et al. |
| 2005/0021454 A1 | 1/2005 | Karpovich et al. |
| 2005/0038743 A1 | 2/2005 | Stanley et al. |
| 2005/0044043 A1 | 2/2005 | Gooding et al. |
| 2005/0086136 A1 | 4/2005 | Love et al. |
| 2005/0167481 A1 | 8/2005 | Hansen et al. |
| 2005/0177464 A1 | 8/2005 | Komem et al. |
| 2005/0209961 A1 | 9/2005 | Michelsen et al. |

OTHER PUBLICATIONS

Eurogiro, Development of Interface Between FED and Eurogiro, Request for Proposal, Jan. 14, 2003, Uwe Holmsgaard, Eurogiro Network A/S.

Fedline User Guide, ACH, Version 2.4, Mar. 2002, including Fedline User Guide, Host Communications, Version 2.4, Jun. 1997.

ACH Goes Across the Border, South Florida Banking Institute, Vicki Anderson, Retail Payments Office, Federal Reserve System, Oct. 29, 2001.

William B. Nelson, ACH News from Europe, Payments Journal, Jan./Feb. 2002.

International Direct Deposit Technical Walkthru, Prepared for IRPPO, Oct. 9, 2002.

FedACH Product Development Discussion, Federal Reserve Financial Services, U.S. Bank, Nov. 30, 2001.

International Direct Deposit Overview, Electronic Payments, EROC, Federal Reserve Bank of New York, Oct. 9, 2002.

Overview of the Federal Reserve System's Check to ACH Conversion (CTAC). Product, Presented Feb. 15, 2002.

Overview, Federal Reserve and Check to ACH Conversion (CTAC), Presented to SWACHA—The Electronic Payments Resource, Jul. 31, 2002.

The Federal Reserve & Check-to-ACH Conversion, NACHA Electronic Check Conference, Sep. 23-24, 2002 terry Roth, Retail Payments Office of the Federal Reserve System.

2002 ACH Rules, A Complete Guide to Rules & Regulations Governing the ACH Network, National Automated Clearing House Association, Copyright 2002. Attached pp. 1) Understanding the ACH Network: An ACH Primer, pp. 1-17; 2) Operating Rules of the National Automated Clearing house Association, Article Eight, pp. 28-29; 3) Operating Guidelines of the National Automated Clearing House Association: Section II, Chapter III, pp. 40-45; and Section IV, Chapter VI, pp. 120-140; and 4) Federal Reserve bank Uniform operating Circular [No. 4] on Automated Clearing House Items, Jun. 25, 2001.

PC AIMS User's Guide, Credit Controls, pp. 10-1 to 10-8, Feb. 25, 2002.

EPN Voice Response System (RALPH). Applicants submit that this document was published prior to Sep. 30, 2003.

NACHA Rule Amendment for Third-Party Service Providers: A Case Study, Chris Daniel, Partner, Alston & Bird LLp.

The Impact of NACHA Rule Changes on Third Party Service Providers, Dec. 15, 2004, Deborah Shaw, Senior Director of Network Services, NACHA.

(56) References Cited

OTHER PUBLICATIONS

NACHA Third Party ACH Rules: Improving Risk Management for Financial Institutions, Dec. 15, 2004, Mary O'Toole, Vice President, Bank of America.

"Fixed-to-Fixed Foreign Exchange (F3x) Pilot Overview", Dec. 18-19, 2006.
"Fixed-to-Fixed Foreign Exchange (F3x) Pilot Overview", Dec. 25, 2007.

* cited by examiner

US 8,700,510 B2

REDIRECTING OR RETURNING INTERNATIONAL CREDIT TRANSFERS

CROSS-REFERENCE TO RELATED APPLICATION

This application claims the benefit of U.S. Provisional Application No. 61/441,707, filed Feb. 11, 2011, the entire contents of which are hereby incorporated herein by reference.

TECHNICAL FIELD

The present invention relates to managing credit transfer items that fail to clear a domestic Automated Clearing House system and, more particularly, to items that are unable to be processed because of a particular combination of inoperable routing and account numbers.

BACKGROUND

Although outbound International Automated Clearing House credit transfer items ("IATs") have a relatively low rate of return for failure of the items to clear, inbound IATs have a much higher rate of return. In some cases, for example, the problem is caused by the fact that IATs bound for the U.S. Automated Clearing House ("ACH") network are formatted using inoperable routing and account information for posting a credit to a Receiving Depository Financial Institution ("RDFI") via the U.S. ACH network. In the case of such inoperable routing and account information, an RDFI of an IAT credit transfer will not accept the IAT when it is routed through the U.S. ACH network. In this case, the IAT is returned or rejected by the RDFI. Returned or rejected IATs create a hardship for the intended receiver, the originator, and the intermediaries to the transaction.

The system and method described herein addresses the above-described and other problems by providing a method and system to redirect credit transfers that fail to post or settle when introduced into the U.S. ACH network. Accordingly, the entity that introduces the transfers into the U.S. payment system can ensure successful posting and settlement for an increased proportion of IATs received from foreign senders.

SUMMARY OF THE INVENTION

In one embodiment, a system for redirecting or returning international credits is described including a gateway operator comprising a routing processor configured to receive a credit transfer from a foreign originator, compare routing and account numbers of the credit transfer with a predetermined table of routing and account numbers, and forward the credit transfer based on the comparison of the routing and account numbers with the predetermined table, an Automated Clearing House (ACH) that presents the credit transfer to a Receiving Depository Financial Institution (RDFI) for clearing and settlement, when the credit transfer is received by the automated clearing house from the gateway operator, and a wire transfer service that presents the credit transfer to the RDFI for clearing and settlement, when the credit transfer is received by the wire transfer service from the gateway operator.

In one aspect, the routing processor is further configured to forward the credit transfer to the ACH when the comparison with the predetermined table does not identify that the routing and account numbers are inoperable for posting a credit to the RDFI via the ACH. In another aspect, the routing processor is further configured to, when the comparison with the predetermined table identifies that the routing and account numbers are inoperable for posting a credit to the RDFI via the ACH but does not identify that the routing and account numbers are inoperable for posting a credit to the RDFI via the wire transfer service, convert a format of the credit transfer to a format of the wire transfer service and forward the wire-formatted credit transfer to the wire transfer service. The routing and account number processor may be further configured to reformat the credit transfer to a return format item when the comparison with the predetermined table identifies that the routing and account numbers are inoperable for posting a credit to the RDFI via both the ACH and the wire transfer service, and return the return format item to the foreign originator.

In other aspects, the routing and account number processor is further configured to receive a return or reject item, determine whether routing and account numbers associated with the return or reject item are inoperable for posting a credit to the RDFI via the ACH or are inoperable for posting a credit to the RDFI via the wire transfer service, and update the predetermined table of routing and account numbers according to whether the return or reject item is inoperable for posting a credit to the RDFI via the ACH or inoperable for posting a credit to the RDFI via the wire transfer service. The routing and account number processor may be further configured to receive a return or reject item, determine whether routing and account numbers associated with the return or reject item are inoperable for posting a credit to the RDFI via the ACH or are inoperable for posting a credit to the RDFI via the wire transfer service, and, when the return or reject item is determined to be inoperable for posting a credit to the RDFI via the ACH but is not determined to be inoperable for posting a credit to the RDFI via the wire transfer service, update the predetermined table of routing and account numbers to indicate that the routing and account numbers are inoperable as an ACH credit transfer item and reformat the return or reject item into a wire-formatted credit transfer item. The routing and account number processor may also be further configured to send the wire-formatted credit transfer item to the wire transfer service for posting to an account of the RDFI.

In still other aspects, the routing and account number processor is further configured to receive a return or reject item, determine whether routing and account numbers associated with the return or reject item are inoperable for posting a credit to the RDFI via the ACH or are inoperable for posting a credit to the RDFI via the wire transfer service, and, when the return or reject item is determined to be inoperable for posting a credit to the RDFI via the ACH and determined to be inoperable for posting a credit to the RDFI via the wire transfer service, update the predetermined table of routing and account numbers to indicate that the routing and account numbers are inoperable as both ACH and wire transfer service credit transfer items and reformat the return or reject item into a return format item. The routing and account number processor may be further configured to send the return item to the foreign originator.

In another embodiment, a method for redirecting or returning international credits is described including receiving a credit transfer from a foreign originator, comparing, by a routing processor, routing and account numbers of the credit transfer with a predetermined table of routing and account numbers, forwarding the credit transfer to an Automated Clearing House (ACH) for posting to an account of a Receiving Depository Financial Institution (RDFI), when the comparison of the routing and account numbers with the predetermined table does not identify that the routing and account numbers are inoperable for posting a credit to the RDFI via the ACH, and forwarding the credit transfer to a wire transfer service for posting to the account of the RDFI, when the comparison of the routing and account numbers with the predetermined table does identify that the routing and account numbers are inoperable for posting a credit to the RDFI via the ACH.

In one aspect, forwarding the credit transfer to the wire transfer service further comprises forwarding the credit transfer to the wire transfer service when the comparison of the routing and account numbers with the predetermined table does identify that the routing and account numbers are inoperable for posting a credit to the RDFI via the ACH but does not identify that the routing and account numbers are inoperable for posting a credit to the RDFI via the wire transfer service. The method may further comprise reformatting the credit transfer to a return format item when the comparison of the routing and account numbers with the predetermined table identifies that the routing and account numbers are inoperable for posting a credit to the RDFI via the ACH and are inoperable for posting a credit to the RDFI via the wire transfer service, and returning the return format item to the foreign originator. The method may further comprise receiving, by the routing processor, a return or reject item, determining, by the routing processor, whether routing and account numbers associated with the return or reject item are inoperable for posting a credit to the RDFI via the ACH or are inoperable for posting a credit to the RDFI via the wire transfer service, and updating the predetermined table of routing and account numbers according to whether the return or reject item is inoperable for posting a credit to the RDFI via the ACH or inoperable for posting a credit to the RDFI via the wire transfer service.

In other aspects, the method further comprises receiving, by the routing processor, a return or reject item, determining, by the routing processor, whether routing and account numbers associated with the return or reject item are inoperable for posting a credit to the RDFI via the ACH or are inoperable for posting a credit to the RDFI via the wire transfer service, and when the return or reject item is determined to be inoperable for posting a credit to the RDFI via the ACH but is not determined to be inoperable for posting a credit to the RDFI via the wire transfer service, updating the predetermined table of routing and account numbers to indicate that the routing and account numbers are inoperable as an ACH credit transfer item and reformatting the return or reject item into a wire-formatted credit transfer item. The method may further comprise sending the wire-formatted credit transfer item to the wire transfer service for posting to the account of the RDFI.

In still other aspects, the method further comprises receiving, by the routing processor, a return or reject item, determining whether routing and account numbers associated with the return or reject item are inoperable for posting a credit to the RDFI via the ACH or are inoperable for posting a credit to the RDFI via the wire transfer service, and, when the return or reject item is determined to be inoperable for posting a credit to the RDFI via the ACH and determined to be inoperable for posting a credit to the RDFI via the wire transfer service, update the predetermined table of routing and account numbers to indicate that the routing and account numbers are inoperable as both ACH and wire transfer service credit transfer items and reformatting the return or reject item into a return format item. The method may further comprise sending the return item to the foreign originator.

In still another embodiment, a computer-readable storage device is described. The computer-readable storage device stores computer readable instructions thereon that, when executed by a processor, direct the processor to perform a method for redirecting or returning international credits including receiving a credit transfer from a foreign originator, comparing, by the processor, routing and account numbers of the credit transfer with a predetermined table of routing and account numbers, forwarding the credit transfer to an Automated Clearing House (ACH) for posting to an account of a Receiving Depository Financial Institution (RDFI), when the comparison of the routing and account numbers with the predetermined table does not identify that the routing and account numbers are inoperable for posting a credit to the RDFI via the ACH, and forwarding the credit transfer to a wire transfer service for posting to the account of the RDFI, when the comparison of the routing and account numbers with the predetermined table does identify that the routing and account numbers are inoperable for posting a credit to the RDFI via the ACH.

These and other aspects, objects, features, and embodiments will become apparent to a person of ordinary skill in the art upon consideration of the following detailed description of illustrative embodiments of the present invention.

BRIEF DESCRIPTION OF THE DRAWINGS

For a more complete understanding of the invention and the advantages thereof, reference is now made to the following description, in conjunction with the accompanying figures briefly described as follows.

DETAILED DESCRIPTION

Figure 1:
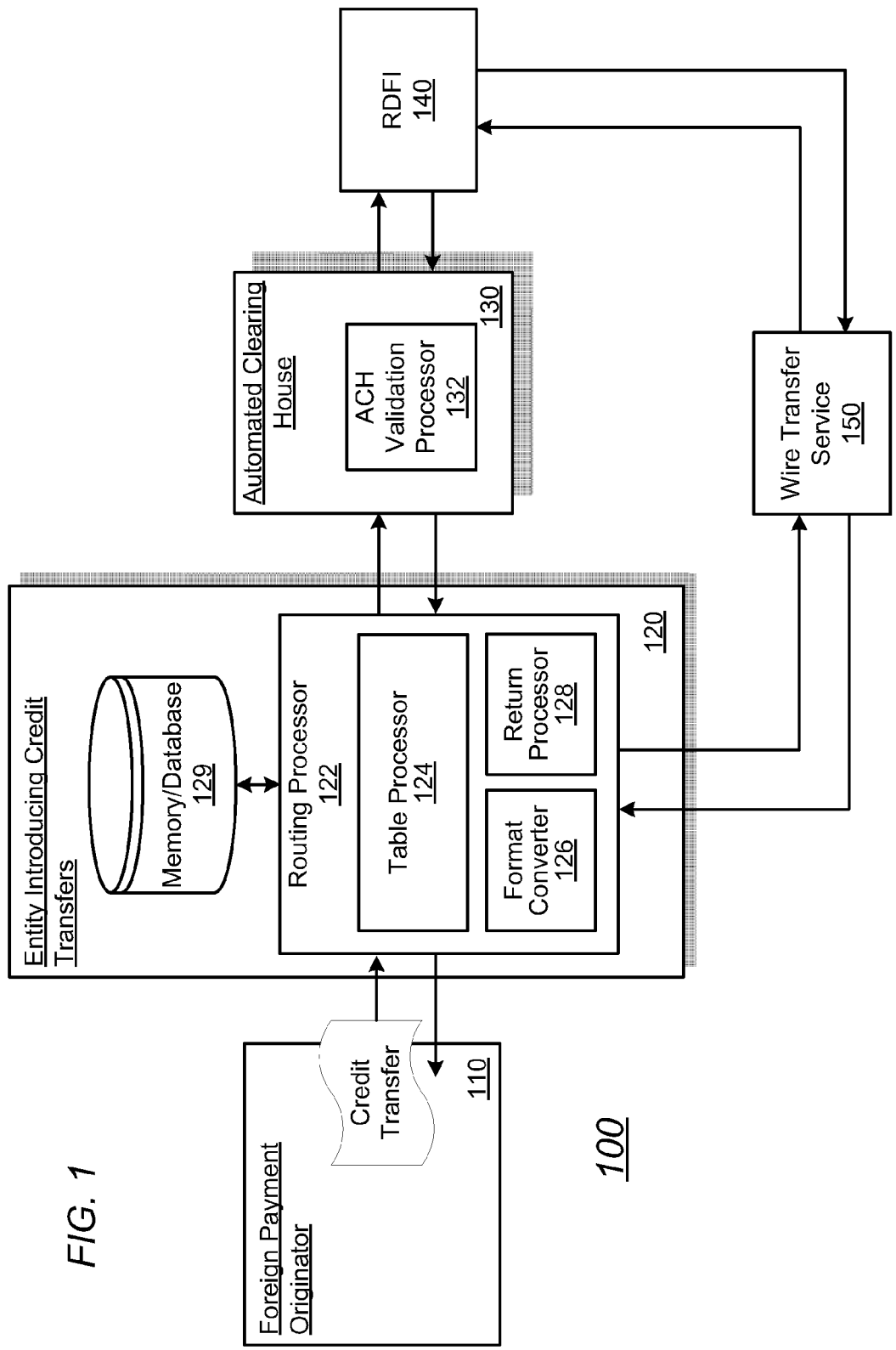
FIG. 1 illustrates a system for redirecting or returning international ACH credits according to one embodiment described herein.

In the following paragraphs, the present invention will be described in further detail by way of example with reference to the attached drawings. In the description, well known components, methods, and/or processing techniques are omitted or briefly described so as not to obscure the invention. As used herein, the "present invention" refers to any one of the embodiments of the invention described herein and any equivalents. Furthermore, reference to various feature(s) of the "present invention" is not to suggest that all embodiments must include the referenced feature(s).

Among embodiments, some aspects of the present invention are implemented by a computer program executed by one or more processors, as described and illustrated. As would be apparent to one having ordinary skill in the art, the present invention may be implemented, at least in part, by computer-readable instructions in various forms, and the present invention is not intended to be limiting to a particular set or sequence of instructions executed by the processor.

The present invention is described in terms of domestic and foreign entities, where entities within the United States are provided as examples of "domestic" entities. However, one of skill in the art would appreciate that the present invention may be implemented similarly among any entities that transfer funds internationally. Further, the disclosure of the present invention describes international credit transfers via international ACH and wire transfer services, although one of ordinary skill in the art would appreciate that the present invention may be implemented using any industry standard international credit transfer services that transfers funds into a designated account at a bank.

Certain IAT credit transfers introduced to the United States ("U.S.") for clearing through the U.S. ACH system will be returned by a Receiving Depository Financial Institution ("RDFI") even if a valid routing number and an active account number are provided, because the RDFI lacks a process for posting ACH credits to the account specified by the credit transfer, for example. If the RDFI returns an ACH credit transfer, the entity that introduced the transfer into the U.S. ACH system may use the methods and systems described herein to redirect the credit transfer to the RDFI via a wire transfer system to complete the credit transfer. If the RDFI rejects the credit transfer over the wire transfer system or otherwise notifies the entity that introduced the transfer into the U.S. that the wire transfer cannot be posted to an account of an associated beneficiary, the entity that introduced the transfer into the U.S. ACH system may use the methods and systems described herein to return the credit transfer to the foreign originator that initially sent the transfer into the U.S. ACH system.

Embodiments described herein comprise a routing processor that maintains one or more tables of (i) bank routing/account numbers ("RTN/account numbers") that cannot be used to clear a credit transfer through the U.S. ACH system but can be used to complete a credit transfer through the U.S. wire transfer system, and (ii) bank RTN/account numbers that cannot be used to clear a credit transfers through either the U.S. ACH system or the U.S. wire transfer system. The routing processor is used by an entity that introduces credit transfers into the U.S., such as a U.S. gateway operator. The entity that introduces credit transfers into the U.S. receives incoming credit transfers from a foreign payment originator and routes the transfers to an RDFI in the U.S. after a comparison between routing and account numbers of the credit transfer with a predetermined table or tables of RTN/account number combinations stored in an account number table maintained by the routing processor.

Among aspects, the predetermined table of RTN/account number combinations may be updated in various circumstances and according to various procedures. The predetermined table of RTN/account number combinations may also be transmitted to foreign payment originators, so that the foreign payment originators can identify RTN/account number combinations that are inoperable or will fail to post a credit.

As generally defined herein, "inoperable" RTN/account numbers comprise combinations of routing and account numbers that fail to result in a credit being posted to an account of an associated beneficiary. More particularly, inoperable RTN/account numbers comprise combinations of routing and account numbers that fail to post a credit via the U.S. ACH system and/or a U.S. wire transfer system. On the other hand, "operable" RTN/account numbers comprise combinations of routing and account numbers that result in a credit being posted to an account of an associated beneficiary.

Turning now to the Figures, in which like numerals indicate like elements throughout, exemplary embodiments of the invention are described in further detail.

FIG. 1 illustrates a system 100 for redirecting or returning international ACH credits according to one embodiment of the present invention. The system 100 comprises a foreign payment originator 110, an entity introducing credit transfers 120, an ACH 130, an RDFI 140, and a wire transfer service 150. The foreign payment originator 110, entity introducing credit transfers 120, ACH 130, RDFI 140, and wire transfer service 150 are communicatively coupled as illustrated in FIG. 1 by a communications network, such as any well known private and/or public wired or wireless network and combinations thereof, as understood in the art.

The foreign payment originator 110 may comprise a foreign bank, foreign financial institution, or foreign financial intermediary. For example, the foreign payment originator 110 may comprise a foreign gateway operator that forwards credit transfers including IAT credit transfers from foreign banks to the entity introducing credit transfers 120. The entity introducing credit transfers 120 is a domestic entity such as a domestic gateway operator that receives credit transfers from the foreign payment originator 110, including IAT credit transfers. The entity introducing credit transfers 120 is described in further detail below. The ACH 130 is an electronic network for financial transactions. The ACH 130 is capable of processing large volumes of credit and debit transactions between banks and other financial institutions. As a more particular example, the ACH 130 may comprise the NACHA administrated ACH network within the United States.

The RDFI 140 comprises an institution such as a bank or other receiving depository institution that receives an ACH transaction to be posted to an account of a receiver party, as a customer of the RDFI. Generally, via system 100, an IAT credit transaction may be sent from the foreign payment originator 110, received by the entity introducing credit transfers 120, transmitted from the entity introducing credit transfers 120 to the RDFI 140 via the ACH 130, and received by the RDFI 140 for posting to the account of the receiver party. In this manner, funds may be transferred using the system 100 to an account maintained for a customer of the RDFI 140 from a foreign entity or party.

The wire transfer service 150 comprises a wire transfer service such as the Federal Reserve's FEDWIRE® transfer service, the Clearing House Interbank Payments System ("CHIPS") transfer service, or another wire transfer service. Relative to the ACH 130, the wire transfer service 150 is used to provide immediate and irrevocable transfer of funds, for a smaller volume of transactions. Transactions carried by the wire transfer service 150 may provide a more immediate and individualized means of funds transfer but at a higher cost as compared to the ACH 130.

As illustrated in FIG. 1, the entity introducing credit transfers 120 comprises a routing processor 122 and a memory or database 129. The routing processor 122 comprises a table processor 124, a format converter 126, and a return processor 128. The table processor 124 is configured to maintain a database of one or more RTN/account number tables stored in the memory 129. The format converter 126 is configured to convert formats of credit transfers received by and returned to the entity introducing credit transfers 120. For example, the format converter 126 may convert credit transfer formats between ACH and FEDWIRE® formats, as described in further detail below. The return processor 128 is configured to receive returned or rejected credit transfer items or notifications that certain credit transfer items are being returned or rejected by the ACH 130, the RDFI 140, or the wire transfer service 150. In other words, based on feedback from the ACH 130, the RDFI 140, and/or the wire transfer service 150, the return processor 128 is configured to identify that a particular RTN/account number combination is inoperable for posting a credit to an account of an associated beneficiary. More specifically, the return processor 128 is configured to distinguish, based on the feedback from the ACH 130, the RDFI 140, and/or the wire transfer service 150, that an RTN/account number combination is inoperable for posting a credit to the RDFI 140 via one or both of the ACH 130 and the wire transfer service 150. The feedback from the ACH 130, the RDFI 140, and/or the wire transfer service 150 may comprise a return reason code, a notification of rejection by the RDFI 140, or a notification of rejection by the wire transfer service 150, for example, without limitation.

The memory 129 stores the one or more tables of RTN/account numbers ("number tables") maintained by the routing and table processors 122 and 124. For example, the number tables may comprise (i) bank RTN/account number combinations that cannot be used to clear a credit transfer through the U.S. ACH system but that can be used to complete a credit transfer through the U.S. wire transfer system, and (ii) RTN/account number combinations that cannot be used to clear a credit transfers through either the U.S. ACH system or the U.S. wire transfer system. The number tables stored in the memory 129 are updated pursuant to several processes as directed by the routing and table processors 122 and 124, as discussed below. As they are updated, the number tables are also predetermined for each credit transfer item newly received from the foreign payment originator 110.

In one embodiment, the routing processor 122 is configured to receive an IAT credit transfer from the foreign payment originator 110, compare routing and account numbers of the credit transfer with the number tables stored in the memory 129 using the table processor 124, and forward the credit transfer based on the comparison of the routing and account numbers with the number tables stored in the memory 129. As described in further detail below, the routing processor 122 may forward the credit transfer to the ACH 130 when the comparison with the number tables does not identify a previous ACH return for the routing and account numbers of the credit transfer. Alternatively, the routing processor 122 may forward the credit transfer to the wire transfer service 150 when the comparison with the number tables does identify a previous ACH return for the routing and account numbers of the credit transfer. It is noted that credit transfers received by the entity introducing credit transfers 120 from the foreign payment originator 110 may be credit transfers in an ACH format (i.e., IAT credit transfers) or credit transfers in other known formats, and the routing processor 122 may convert formats of the credit transfers among multiple formats, as necessary, before forwarding them.

For example, before forwarding a received IAT credit transfer to the ACH 130, the routing processor 122 may convert a format of the IAT credit transfer using the format converter 126, in part, to an ACH-formatted credit transfer according to the required format of the ACH 130. In some cases, received IAT credit transfers may not need to be converted in format before being forwarded. In other words, as described herein, received IAT credit transfers generally comprise ACH-formatted credit transfers received from foreign payment originators. Before being forwarded to the wire transfer service 150, however, received IAT credit transfers are converted by the routing processor 122 into a required format of the wire transfer service 150 using the format converter 126. That is, before being forwarded to the wire transfer service 150, received IAT credit transfers are converted by the format converter 126 into wire-formatted credit transfers. As described herein, wire-formatted credit transfers comprise credit transfers converted into a required format of the wire transfer service 150, such as the Federal Reserve's FEDWIRE® transfer service, using the format converter 126. It is noted that the present invention is not limited to forwarding credit transfers to the ACH 130 and the wire transfer service 150, and the entity introducing credit transfers 120 may forward credit transfers received from the foreign payment originator 110 to services other than or in addition to the ACH 130 and the wire transfer service 150. As such, the routing processor 122 and the format converter 126 may be further configured to convert a format of a received credit transfer to a plurality of different formats used by respective transfer services.

According to other aspects of the present invention, the routing processor 122 is configured to receive a return or reject using the return processor 128, distinguish whether the RTN/account numbers associated with the return or reject item are inoperable for posting a credit via one or both of the ACH 130 and the wire transfer service 150 based on feedback from the ACH 130, the RDFI 140, and/or the wire transfer service 150, and update the number tables stored in the memory 129 according to whether the RTN/account numbers are inoperable for posting a credit. More particularly, the routing processor 122 is configured to receive a return or reject item using the return processor 128, determine whether the RTN/account numbers associated with the return or reject item are inoperable for posting a credit to the RDFI 140 based on feedback from the ACH 130, the RDFI 140, and/or the wire transfer service 150, and, when the RTN/account numbers are determined to be inoperable for posting a credit to the RDFI 140 via the ACH 130 based on the feedback, update the number tables with the inoperable RTN/account numbers using the table processor 124. In this case, the number tables are updated to indicate that the RTN/account numbers are inoperable for posting a credit to the RDFI 140 via the ACH 130 as an ACH credit transfer item. Further, when the RTN/account numbers are determined to be inoperable for posting a credit to the RDFI 140 via the ACH 130, the routing processor 122 is configured to convert a format of an associated ACH-formatted credit transfer item into to a format of the wire transfer service 150 using the format converter 128 and forward the wire-formatted credit transfer item to the wire transfer service 150.

Additionally, the routing processor 122 is further configured to receive a return or reject item using the return processor 128, determine whether RTN/account numbers associated with the return or reject item are inoperable for posting a credit via one or both of the ACH 130 and the wire transfer service 150 based on feedback from the ACH 130, the RDFI 140, and/or the wire transfer service 150, and, when the RTN/account numbers are determined to be inoperable for posting a credit to the RDFI 140 via the wire transfer service 150, update the number tables with the inoperable RTN/account numbers using the table processor 124. In this case, the number tables are updated to indicate that the RTN/account numbers are inoperable for posting a credit to the RDFI 140 via the wire transfer service 150 as a wire transfer service credit transfer item. In turn, the return processor 128 is configured to convert a format of an associated wire-formatted credit transfer item into a return format item suitable for forwarding to the foreign payment originator 100, and the routing processor 122 is configured to forward the return format item to the foreign payment originator 100.

Thus, as described above, the routing processor 122 is configured to redirect credit transfers returned or rejected by the RDFI 140 via the ACH 130 back to the RDFI 140 over the wire transfer service 150, when certain conditions are met. This redirection may be necessary because of inoperable RTN/account numbers, for example, within IAT credit transfers from the foreign payment originator 110. It is noted that foreign institutions that submit IAT credit transfers into the U.S. may not be familiar or experienced with the syntax and formatting requirements of U.S. ACH items. Thus, the foreign institutions are more likely to submit IAT credit transfers with inoperable ACH account, routing, or other information—or combinations thereof. Also, the foreign institutions are more likely to submit IAT credit transfers with formats that may be suitable for U.S. wire transfers but not U.S. ACH transfers. Such inoperable credit transfers result in increased time, resource, and customer frustration costs. The routing processor 122 according to embodiments of the present invention, however, helps to mitigate the costs of inoperable IAT credit transfers, by attempting to redirect those transfers over the wire transfer service 150 before returning them to their originator.

Further to the description provided above, the format converter 126 is configured to transpose data fields of credit transfer items when converting between formats. When converting from ACH to wire transfer service formats, the format converter 126 transposes the RTN/account numbers of an ACH-formatted credit transfer item to respective corresponding fields of a wire-formatted credit transfer item. Similarly, the format converter 126 is configured to transpose originator and destination party names, addresses, identification information, and other addendum data from the ACH-formatted credit transfer item to respective corresponding fields of the wire-formatted credit transfer item. If converting from wire transfer service to ACH formats, the format converter 126 transposes the fields of a wire-formatted credit transfer item to respective corresponding fields of an ACH-formatted credit transfer item.

Also further to the description provided above, the return processor 128 is configured to reformat credit transfer items into a return format item suitable for forwarding back to the foreign payment originator 110. For example, the return processor 128 may reformat a returned or rejected credit transfer item into a format that includes information regarding the reason for return or rejection of the credit transfer item, such as a return reason code, information indicating a reason why the credit transfer could not be posted to the RDFI 140 via the ACH 130 and/or the wire transfer service 150, and other similar information.

When redirecting credit transfers, the routing processor 122 makes reference to the number tables stored in the memory 129. The routing and table processors 122 and 124 maintain and update the number tables, as necessary, based on (1) combinations of RTN/account numbers that are inoperable for posting a credit to the RDFI 140 via one or both of the ACH 130 and the wire transfer service 150 and (2) other information received from RDFIs, wire transfer services, and payment originators. For example, the return processor 128 is configured to receive a return or reject item and determine that an RTN/account number combination of an associated credit transfer item is inoperable for posting a credit to the RDFI 140 via one or both of the ACH 130 and the wire transfer service 150. As noted above, credit transfers may be returned or rejected by the ACH 130, the RDFI 140, or the wire transfer service 150 for several reasons including inoperable RTN/account number combinations. The return processor 128 may determine that an RTN/account number combination of an associated credit transfer item is inoperable based on several factors such as an ACH return reason code, a particular communications channel over which the return or reject item was received, a notification of rejection, header information associated with the return or reject item, or identification information associated with an entity that returned or rejected the item, for example.

Based on a determination by the return processor 128 that an RTN/account number combination is inoperable as an ACH-formatted credit transfer item, the table processor 124 is configured to update one or more tables of RTN/account numbers stored in the memory 129 to include the inoperable RTN/account number combination. In this manner, the routing processor 122 maintains a comprehensive list of credit transfers having RTN/account numbers that are inoperable for posting a credit to the RDFI 140 via the ACH 130. Similarly, the routing processor 122 maintains a comprehensive list of credit transfers having RTN/account numbers that are inoperable for posting a credit to the RDFI 140 via the wire transfer service 150. Thus, the number tables stored in the memory 129 comprise a list of RTN/account number combinations which will be returned or rejected by the ACH 130, the RDFI 140, and/or the wire transfer service 150 (i.e., "inoperable" RTN/account number combinations). As described herein, the number tables comprise a list of inoperable RTN/account number combinations rather than a list of operable RTN/account number combinations. However, in alternative embodiments, the routing and table processors 122 and 124 may maintain and update a list of operable RTN/account number combinations as well as inoperable RTN/account number combinations.

For ACH return items, return reasons codes may include ACH return reason codes such as the R03 no account/unable to locate code, the R04 invalid account number structure code, or the R13 invalid ACH routing number code, among others, as known in the art. It is also noted that ACH items may be returned or rejected from either the ACH 130 or the RDFI 140. For example, when the routing processor 122 forwards a credit transfer including an invalid ACH routing code over the ACH 130, the ACH validation processor 132 of the ACH 130 may identify the invalid ACH routing code before the credit transfer is forwarded to the RDFI 140. In turn, the ACH validation processor 132 is configured to return the credit transfer to the entity introducing credit transfers 120 along with the R13 invalid ACH routing number code, because the credit transfer cannot be completed over the ACH 130. Alternatively, the RDFI 140 may be unable to locate a particular RTN/account number combination and return the credit transfer to the entity introducing credit transfers 120 along with the R03 no account/unable to locate code, because the credit transfer cannot be posted to an account associated with the particular RTN/account number combination. Credit transfer items may also be rejected by the wire transfer service 150 along with a return reason code or a notification that the wire transfer cannot be posted via the wire transfer service 150. For example, an attempt to send a wire transfer may be rejected at the outset by the wire transfer service 150 or a wire transfer may not be accepted by the RDFI 140 via the wire transfer service 150 because of inoperable RTN/account numbers.

In some embodiments, the routing and table processors 122 and 124 may update the number tables based on information received from RDFIs, wire transfer services, and payment originators other than returned or rejected credit transfer items. For example, an RDFI or wire transfer service may provide a list of RTN/account numbers which are known to be inoperable. In this case, the routing and table processors 122 and 124 are further configured to update the number tables based on the provided list of RTN/account numbers known to be inoperable. As another example, an RDFI or wire transfer service may provide a list of RTN/account numbers which were inoperable, but are now operable. In this case, the routing and table processors 122 and 124 are further configured to update the number tables with the combinations of RTN/account numbers that are now identified as being operable.

In further aspects, the routing and table processors 122 and 124 may be configured to periodically test whether the RTN/account numbers in the number tables are still inoperable. To that end, the routing and table processors 122 and 124 may send test credit transfers or pre-note test messages over the ACH 130 or the wire transfer service 150 for certain ones of the RTN/account numbers in the number tables, to determine whether the RTN/account numbers are still inoperable. Periodic testing of the RTN/account numbers may occur on any periodic time basis such as weekly or monthly. The periodic testing of the RTN/account numbers may occur for each of the RTN/account numbers in the number tables or only a subset of the RTN/account numbers in the number tables. For example, the periodic testing may occur for RTN/account numbers identified as being inoperable by the return processor 128 based on a return reason code, but not for RTN/account numbers expressly identified as being inoperable by the RDFI 140 or the wire transfer service 150. Thus, the number tables may be continuously updated and revised.

The one or more tables of RTN/account numbers stored in the memory 129 may be organized in various formats and include various data fields or attributes associated with each RTN/account number combination listed as being inoperable for an ACH or wire transfer service credit transfer. For example, RTN/account number combinations that are inoperable as ACH credit transfers may be listed on a table that is separate from RTN/account number combinations that are inoperable as wire transfer service credit transfers. Alternatively, RTN/account number combinations that are inoperable as both ACH and wire transfer service credit transfers may be listed on a same table, with associated attribute data indicating the difference between inoperable ACH and wire transfer service RTN/account number combinations. Further, each listed RTN/account number combination may be listed with an associated return reason code, a date the number combination was added to the table, and a date the number combination was last checked for inoperability. In other aspects, for simplicity of and fast access to the tables of RTN/account numbers, wildcards may be used in entries of the tables to cover spans of routing or account numbers, as would be understood by one having ordinary skill in the art.

Figure 2:
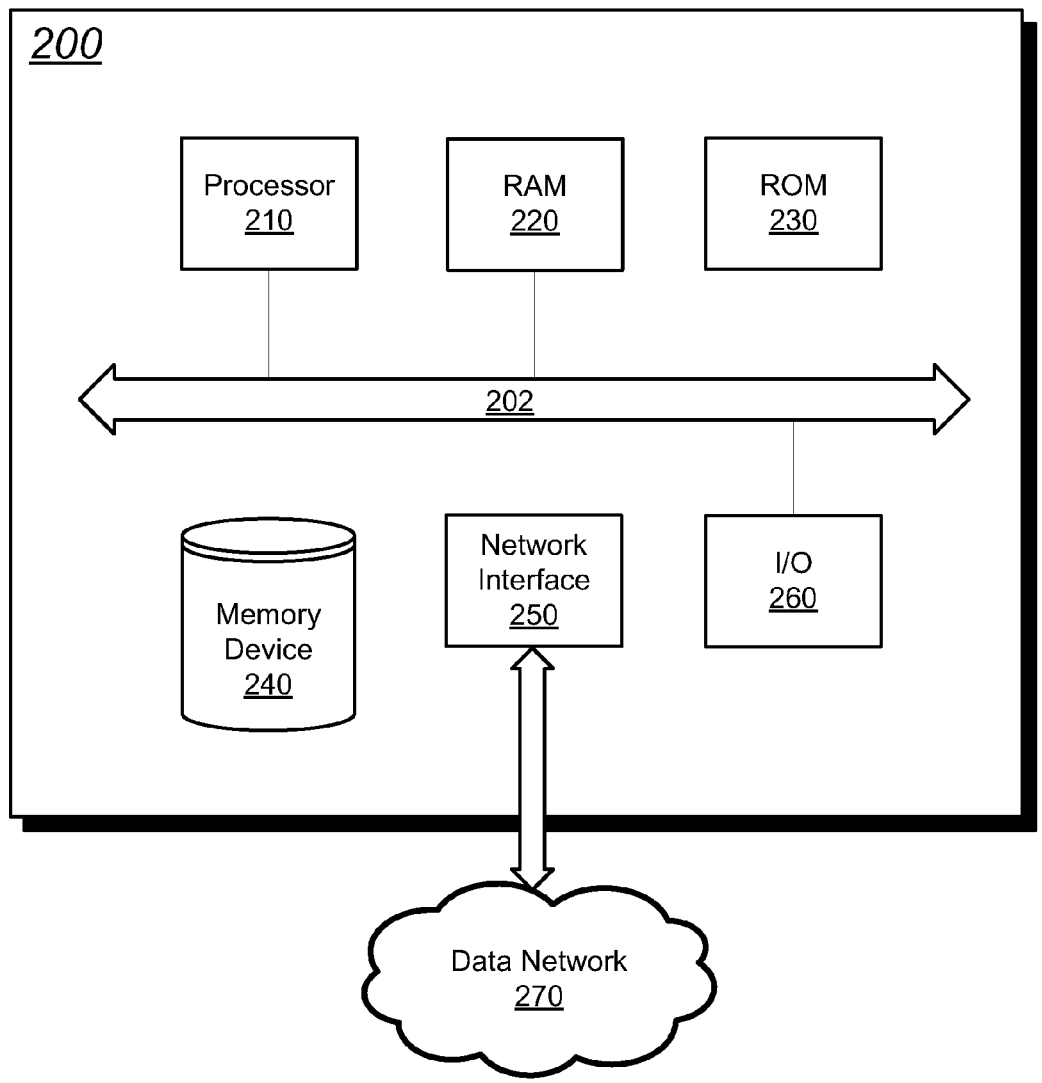
FIG. 2 illustrates a general purpose computer that may be used to implement one or more elements of a system for redirecting or returning international ACH credits.

Turning to FIG. 2, an example hardware diagram of a general purpose computer 200 is illustrated. Any of the foreign payment originator 110, entity introducing credit transfers 120, ACH 130, RDFI 140, and wire transfer service 150 may be implemented, in part, using the general purpose computer 200. The computer 200 includes a processor 210, a Random Access Memory ("RAM") 220, a Read Only Memory ("ROM") 230, a memory device 240, a network interface 240, and an Input Output ("I/O") interface 260. The elements of the computer 200 are communicatively coupled via a bus 202.

The processor 210 comprises any well known general purpose arithmetic processor or Application Specific Integrated Circuit ("ASIC"). Both the RAM 220 and the ROM 230 comprise well known random access and read only memory devices, respectively, that store computer-readable instructions to be executed by the processor 210. The memory device 240 stores computer-readable instructions thereon that, when executed by the processor 210, direct the processor 210 to execute various aspects of the present invention described herein. When the processor 210 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 240 may comprise one or more of an optical disc, a magnetic disc, a semiconductor memory (i.e., a flash based memory), a magnetic tape memory, a removable memory, combinations thereof, or any other known memory means for storing computer-readable instructions. The I/O interface 260 comprises device input and output interfaces such as keyboard, pointing device, display, communication, and other interfaces. The bus 202 electrically and communicatively couples the processor 210, the RAM 220, the ROM 230, the memory device 240, the network interface 250, and the I/O interface 260, so that data and instructions may be communicated among them. In operation, the processor 210 may be configured to retrieve computer-readable instructions stored on the memory device 240, the ROM 230, or another storage means, and copy the computer-readable instructions to the RAM 220 for execution. The processor 210 may be further configured to execute the computer-readable instructions to implement various aspects and features of the present invention described herein. For example, the processor 210 may be adapted and configured to execute the processes described below with reference to FIGS. 3 and 4, including the processes described as being performed by the routing processor 122. Also, the memory device 240 may store the number tables described herein, alone or in combination with other memory devices.

Figure 3:
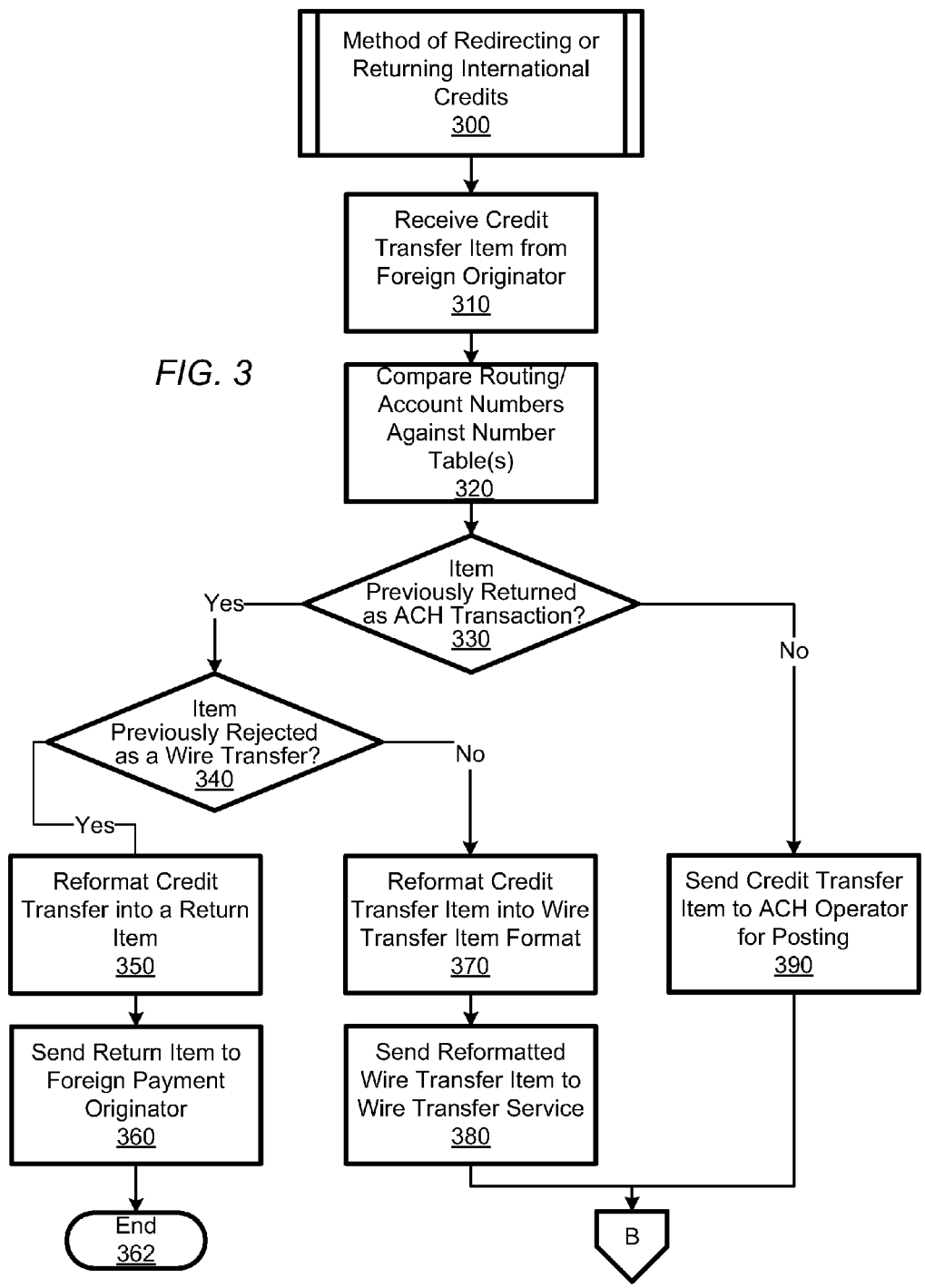
FIG. 3 illustrates a process of redirecting or returning international ACH credits according to one embodiment described herein.
Figure 4:
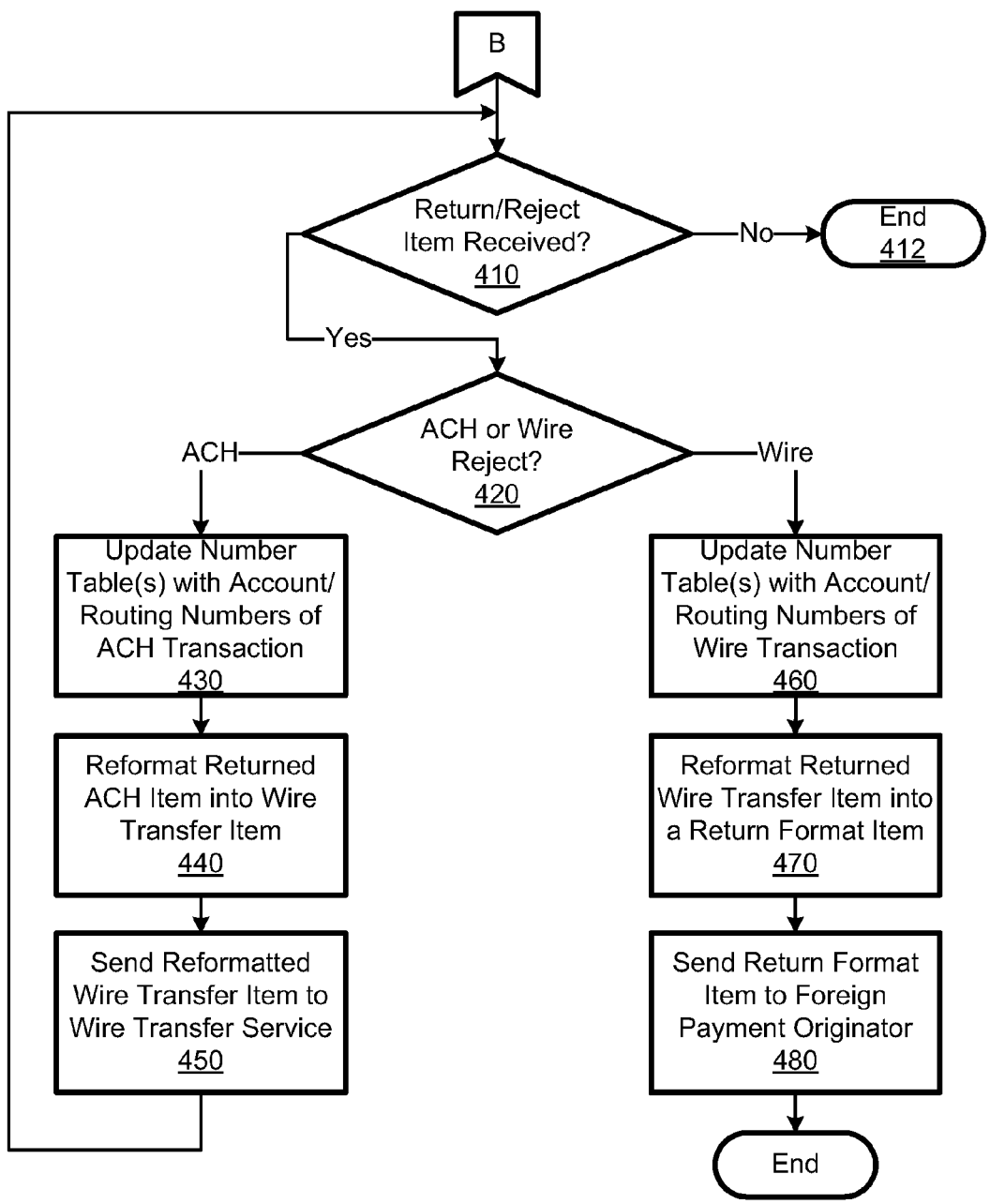
FIG. 4. further illustrates the process of redirecting or returning international ACH credits.

Before turning to the process flow diagrams of FIGS. 3 and 4, it is noted that the present invention may be practiced using an alternative order of the steps illustrated in FIGS. 3 and 4. That is, the process flows illustrated in FIGS. 3 and 4 are provided as examples only, and the present invention may be practiced using process flows that differ from those illustrated. Additionally, it is noted that not all steps are required in every embodiment. In other words, one or more of the steps may be omitted or replaced, without departing from the spirit and scope of the invention. In alternative embodiments, steps may be performed in different orders, in parallel with one another, or omitted entirely, and/or certain additional steps may be performed without departing from the scope and spirit of the invention.

FIG. 3 illustrates a method 300 of redirecting or returning international credits. The method 300 may be performed by the routing processor 122 of the entity introducing credit transfers 120. At step 310, the routing processor 122 receives a credit transfer item from the foreign payment originator 110. The credit transfer item may be an IAT credit transfer item as discussed above. At step 320, the routing processor 122 compares the RTN/account numbers of the received credit transfer item to RTN/account numbers in the number tables stored in the memory 129 using the table processor 124. Based on the comparison at step 320, the routing processor 122 determines whether the credit transfer item was previously returned as an ACH transaction at step 330. When the routing processor 122 determines that the credit transfer item was not previously returned as an ACH transaction at step 330, the routing processor 124 proceeds to step 390, where the routing processor 122 forwards the credit transfer item to the ACH 130. In turn, the ACH 130 forwards the credit transfer item to the RDFI 140. In other words, the credit transfer item is presented to the RDFI 140 via the ACH 130 for posting to an account of a customer of the RDFI 140. Before forwarding the credit transfer item to the RDFI 140, the format converter 126 may convert a format of the credit transfer item into an ACH-formatted credit transfer item, if necessary, based on the format of the credit transfer item received from the foreign payment originator 110. As noted above, some IAT credit transfer items received from foreign payment originators may not need to be converted in format (or only nominally modified) before being forwarded to an RDFI over the ACH 130.

The RDFI 140 will post a credit to an account of a customer according to the RTN/account numbers of the ACH-formatted credit transfer item received over the ACH 130 from the entity introducing credit transfers 120. However, if the RDFI 140 cannot post a credit to the account of the customer because of an inoperable RTN/account number combination, the RDFI 140 will return or reject the ACH-formatted credit transfer item along with a return reason code, for example. The RDFI 140 may return the ACH-formatted credit transfer item along with a return reason code to the ACH 130, when the RDFI 140 is unable to post the credit to the account of the customer. As described above, the RDFI 140 may return the ACH-formatted credit transfer item along with the R03 no account/unable to locate code, for example. In turn, the ACH 130 returns the credit transfer item along with the return reason code to the routing processor 122 of the entity introducing credit transfers 120.

With reference to FIG. 4, the routing processor 122 determines whether a return or reject item is received at step 410 using the return processor 128. If no return or reject item is received at step 410, the method 300 concludes at step 412 (i.e., the RDFI 140 posted a credit to the account of the customer). If a return or reject item is received, the routing processor 122 proceeds to step 420 where the return processor 128 determines whether an RTN/account number associated with the return or reject item is inoperable for posting a credit to the RDFI 150 via the ACH 130 or the wire transfer service 150 based on feedback from the ACH 130, the RDFI 140, and/or the wire transfer service 150 at step 420. It is noted that the feedback may comprise a return reason code, a particular communications channel over which the return or reject item was received, a notification of rejection, header information associated with the return or reject item, or identification information associated with an entity that returned or rejected the item, for example.

When the return processor 128 determines that the return or reject item is an ACH return item, the routing processor 122 proceeds to step 430, and the routing and table processors 122 and 124 update the number tables stored in the memory 129 with the RTN/account number combination of the returned ACH credit transfer item. In this manner, the number tables stored in the memory 129 are updated to reflect the RTN/account number combination of the returned ACH credit transfer item, because the item was unable to be posted as a credit at the RDFI 140 via the ACH 130. The routing processor 122 thus maintains a current list of RTN/account number combinations which fail to post as ACH-formatted credit transfers at the RDFI 140 over the ACH 130. The routing processor 122 then proceeds to step 440 and reformats the returned ACH-formatted credit transfer item to a wire-formatted credit transfer item using the format converter 126. That is, the routing processor 122 relies on the format converter 126 at step 440 to transpose the RTN/account numbers of the returned ACH-formatted credit transfer item to respective corresponding fields of a wire-formatted credit transfer item. The routing processor 122 also transposes any additional fields of the returned ACH-formatted credit transfer item into respective corresponding fields of the wire-formatted credit transfer item, as necessary. At step 450, the routing processor 122 sends the wire-formatted credit transfer item to the wire transfer service 150. In turn, the wire transfer service 150 forwards all received and accepted wire-formatted credit transfer items to the RDFI 140.

After sending the wire-formatted credit transfer item to the wire transfer service 150 at step 450, the routing processor 122 returns back to step 410 to determine if a return or reject item is received. For example, the wire transfer service 150 or the RDFI 140 may reject the transfer along with a notification of the rejection or a reject reason code. Rejected wire transfer items are identified and distinguished from returned or rejected ACH items by the return processor 128 at step 420. That is, the return processor 128 determines at step 420 whether an RTN/account number of the return or reject item is inoperable for posting a credit to the RDFI 150 via the ACH 130 or the wire transfer service 150 based on feedback from the ACH 130, the RDFI 140, and/or the wire transfer service 150 at step 420. If the return processor 128 determines that the return or reject item is inoperable for posting a credit to the RDFI 140 via the wire transfer service 150 at step 420, the routing processor 122 proceeds to step 460 where the number tables are updated to reflect the RTN/account number combination of the wire transfer item. Accordingly, the number tables are additionally updated with inoperable RTN/account number combinations of wire-formatted credit transfer items which fail to post credits at the RDFI 140. After updating the number tables with the inoperable RTN/account number combination of the wire transfer item at step 460, the format converter 126 reformats the wire transfer item into a return format item at step 470 and returns the return format item to the foreign payment originator 110 at step 480.

Returning to FIG. 3 for an alternative case, the routing and table processors 122 and 124 may receive a credit transfer item from the foreign originator 110 at step 310 of FIG. 3, compare the RTN/account numbers of the credit transfer item to the number table at step 320, and determine that the credit transfer item includes RTN/account numbers that are inoperable as an ACH-formatted credit transfer item at step 330. In this case, the number table has identified that the RTN/account numbers of the credit transfer item were previously returned or rejected when attempting to post the credit transfer item to an account of the RDFI 140 via the ACH 130. Thus, the routing processor 122 proceeds to step 340 where it determines whether the RTN/account numbers are also inoperable as a wire-formatted credit transfer item at step 340. If the credit transfer item is not identified as being inoperable as a wire transfer transaction at step 340, the routing processor 122 proceeds to step 370 where the format converter 126 converts the format of the credit transfer item to a wire-formatted credit transfer item. The routing processor 122 then forwards the wire-formatted credit transfer item to the wire transfer service 150 at step 380. In this alternative example, the routing processor 122 has identified that the RTN/account numbers were previously found to be inoperable in the format of an ACH-formatted credit transfer item over the ACH 130 but not previously found to be inoperable in the format of a wire-formatted credit transfer item over the wire transfer service 150 at steps 330 and 340. The routing processor 122 has further converted the credit transfer item received from the foreign payment originator 110 into a wire-formatted credit transfer item using the format converter 126 and forwarded the wire-formatted credit transfer item to the wire transfer service 150 at steps 370 and 380. The process then proceeds to step 410 to determine whether a return or reject is received from the RDFI 140 and the remaining steps on FIG. 4 are similar.

Returning to FIG. 3 for another alternative case, the routing and table processors 122 and 124 may receive a credit transfer item from the foreign payment originator 110 at step 310, compare the RTN/account numbers of the credit transfer item to the number tables at 320, and determine that the credit transfer item includes RTN/account numbers previously found to be inoperable as both ACH-formatted and wire-formatted credit transfers at steps 330 and 340. Thus, the routing processor 122 proceeds to step 350 where the return processor 128 reformats the credit transfer item into a return item at step 350 and the routing processor 122 forwards the return item to the foreign payment originator 110 at step 360. After forwarding the return item at step 360, the process concludes at step 362.

According to the method of redirecting or returning international credits 300 described above, certain credit transfers introduced to the U.S. will be forwarded over the ACH 130, redirected over the wire transfer service 150, and returned to the foreign payment originator 110 based on an iterative process. Additionally, the process by which the entity introducing credit transfers 120 determines which credit transfer items are to be forwarded, redirected, and returned is updated over time according to feedback from various entities such as the foreign payment originator 110, the ACH 130, the RDFI 140, and the wire transfer service 150. Ultimately, the process of forwarding, redirecting, and returning saves time, cost, and frustration by automating additional routes for posting received credit transfer items, especially internationally-received credit transfer items.

Although embodiments of the present invention have been described herein in detail, the descriptions are by way of example. The features of the invention described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The invention claimed is:

1. A system for redirecting or returning international credits, comprising:
 a gateway operator comprising:
  a routing processor configured to:
   receive a credit transfer from a foreign originator, wherein the credit transfer is associated with a credit for posting to a Receiving Depository Financial Institution (RDFI),
   compare routing and account numbers of the credit transfer with a predetermined table of routing and account numbers, and
   forward the credit transfer based on the comparison of the routing and account numbers with the predetermined table,
   wherein the routing processor comprises:
    a format converter configured to convert a format of the credit transfer if the credit transfer is returned, wherein the credit transfer is returned when the routing and account numbers of the credit transfer are determined to be inoperable for posting the credit to the RDFI; and
   a return processor configured to:
    receive the credit transfer that is returned, wherein the credit transfer that is returned comprises a return reason code,
    process the return reason code and identify the routing and account numbers of the credit transfer that is returned, and
    update the predetermined table with the routing and account numbers of the credit transfer that is returned;
 an Automated Clearing House (ACH) that presents the credit transfer to the RDFI for clearing and settlement, when the credit transfer is received by the automated clearing house from the gateway operator; and
 a wire transfer service that presents the credit transfer to the RDFI for clearing and settlement, when the credit transfer is received by the wire transfer service from the gateway operator.

2. The system of claim 1, wherein the routing processor is further configured to forward the credit transfer to the ACH when the comparison with the predetermined table does not identify that the routing and account numbers are inoperable for posting the credit to the RDFI via the ACH.

3. The system of claim 1, wherein the format converter is further configured to convert the format of the credit transfer to a format of the wire transfer service and forward the wire-formatted credit transfer to the wire transfer service when the comparison with the predetermined table identifies that the routing and account numbers are inoperable for posting the credit to the RDFI via the ACH but does not identify that the routing and account numbers are inoperable for posting the credit to the RDFI via the wire transfer service.

4. The system of claim 1, wherein the format converter is further configured to
 reformat the credit transfer to a return format item when the comparison with the predetermined table identifies that the routing and account numbers are inoperable for posting the credit to the RDFI via both the ACH and the wire transfer service, and
 return the return format item to the foreign originator.

5. The system of claim 1, wherein the return processor is further configured to
 determine whether routing and account numbers associated with the credit transfer that is returned are inoperable for posting the credit to the RDFI via the ACH or are inoperable for posting the credit to the RDFI via the wire transfer service, and
 update the predetermined table according to whether the return or reject item is inoperable for posting the credit to the RDFI via the ACH or inoperable for posting the credit to the RDFI via the wire transfer service.

6. The system of claim 1, wherein the return processor is further configured to
 determine whether the routing and account numbers of the credit transfer that is returned are inoperable for posting the credit to the RDFI via the ACH or are inoperable for posting the credit to the RDFI via the wire transfer service, and
 when the routing and account numbers of the credit transfer that is returned are determined to be inoperable for posting the credit to the RDFI via the ACH but is not determined to be inoperable for posting the credit to the RDFI via the wire transfer service, update the predetermined table to indicate that the routing and account numbers of the credit transfer that is returned are inoperable as an ACH credit transfer and reformat the return or reject item into a wire-formatted credit transfer.

7. The system of claim 6, wherein the routing and account number processor is further configured to
 send the wire-formatted credit transfer to the wire transfer service for posting to an account of the RDFI.

8. The system of claim 1, wherein the return processor is further configured to
 determine whether the routing and account numbers of the credit transfer that is returned are inoperable for posting the credit to the RDFI via the ACH or are inoperable for posting the credit to the RDFI via the wire transfer service, and when the routing and account numbers of the credit transfer that is returned are determined to be inoperable for posting the credit to the RDFI via the ACH and determined to be inoperable for posting the credit to the RDFI via the wire transfer service, update the predetermined table to indicate that the routing and account numbers of the credit transfer that is returned are inoperable as both ACH and wire transfer service credit transfers and reformat the credit transfer that is returned into a return format item.

9. The system of claim 8, wherein the return processor is further configured to send the return format item to the foreign originator.

10. A method for redirecting or returning international credits, comprising:

receiving a credit transfer from a foreign originator, wherein the credit transfer is associated with a credit for posting at a Receiving Depository Financial Institution (RDFI);

comparing, by a routing processor, routing and account numbers of the credit transfer with a predetermined table of routing and account numbers;

forwarding the credit transfer to an Automated Clearing House (ACH) for posting to an account of the RDFI, when the comparison of the routing and account numbers with the predetermined table does not identify that the routing and account numbers are inoperable for posting the credit to the RDFI via the ACH;

forwarding the credit transfer to a wire transfer service for posting to the account of the RDFI, when the comparison of the routing and account numbers with the predetermined table does identify that the routing and account numbers are inoperable for posting the credit to the RDFI via the ACH;

converting a format of the credit transfer when the credit transfer is returned, wherein the credit transfer is returned when the routing and account numbers of the credit transfer are identified to be inoperable for posting the credit to the RDFI via the ACH or via both the ACH and the wire transfer;

receiving the credit transfer that is returned, wherein the credit transfer that is returned comprises a return reason code;

processing the return reason code and identifying the routing and account numbers of the credit transfer that is returned; and updating the predetermined table with the routing and account numbers of the credit transfer that is returned.

11. The method of claim 10, wherein forwarding the credit transfer to the wire transfer service further comprises forwarding the credit transfer to the wire transfer service when the comparison of the routing and account numbers with the predetermined table does identify that the routing and account numbers are inoperable for posting the credit to the RDFI via the ACH but does not identify that the routing and account numbers are inoperable for posting the credit to the RDFI via the wire transfer service.

12. The method of claim 10, further comprising reformatting the credit transfer that is returned to a return format item when the comparison of the routing and account numbers with the predetermined table identifies that the routing and account numbers are inoperable for posting the credit to the RDFI via the ACH and are inoperable for posting the credit to the RDFI via the wire transfer service; and returning the return format item to the foreign originator.

13. The method of claim 10, further comprising determining, by the routing processor, whether routing and account numbers associated with the credit transfer that is returned are inoperable for posting the credit to the RDFI via the ACH or are inoperable for posting the credit to the RDFI via the wire transfer service; and updating the predetermined table of routing and account numbers according to whether the routing and account numbers of the credit transfer that is returned are inoperable for posting the credit to the RDFI via the ACH or inoperable for posting the credit to the RDFI via the wire transfer service.

14. The method of claim 10, further comprising determining whether routing and account numbers of the credit transfer that is returned are inoperable for posting the credit to the RDFI via the ACH or are inoperable for posting the credit to the RDFI via the wire transfer service; and when the routing and account numbers of the credit transfer that is returned are determined to be inoperable for posting the credit to the RDFI via the ACH but is not determined to be inoperable for posting the credit to the RDFI via the wire transfer service, updating the predetermined table of routing and account numbers to indicate that the routing and account numbers of the credit transfer that is returned are inoperable as an ACH credit transfer and reformatting the credit transfer that is returned into a wire-formatted credit transfer.

15. The method of claim 14, further comprising sending the wire-formatted credit transfer to the wire transfer service for posting to the account of the RDFI.

16. The method of claim 10, further comprising determining whether routing and account numbers of the credit transfer that is returned are inoperable for posting the credit to the RDFI via the ACH or are inoperable for posting the credit to the RDFI via the wire transfer service; and, when the routing and account numbers of the credit transfer that is returned is determined to be inoperable for posting the credit to the RDFI via the ACH and determined to be inoperable for posting the credit to the RDFI via the wire transfer service, update the predetermined table of routing and account numbers to indicate that the routing and account numbers of the routing and account numbers of the credit transfer that is returned are inoperable as both ACH and wire transfer service credit transfers and reformatting the credit transfer that is returned into a return format item.

17. The method of claim 16, further comprising sending the return format item to the foreign originator.

18. A computer-readable storage device storing computer readable instructions thereon that, when executed by a processor, direct the processor to perform a method for redirecting or returning international credits, comprising:

receiving a credit transfer from a foreign originator, wherein the credit transfer is associated with a credit for posting at a Receiving Depository Financial Institution (RDFI);

comparing, by a routing processor, routing and account numbers of the credit transfer with a predetermined table of routing and account numbers;

forwarding the credit transfer to an Automated Clearing House (ACH) for posting to an account of a Receiving Depository Financial Institution (RDFI), when the comparison of the routing and account numbers with the predetermined table does not identify that the routing and account numbers are inoperable for posting the credit to the RDFI via the ACH;

forwarding the credit transfer to a wire transfer service for posting to the account of the RDFI, when the comparison of the routing and account numbers with the predetermined table does identify that the routing and account numbers are inoperable for posting the credit to the RDFI via the ACH;

converting a format of the credit transfer if the credit transfer is returned, wherein the credit transfer is returned when the routing and account numbers of the credit transfer are identified to be inoperable for posting the credit to the RDFI via the ACH or via both the ACH and the wire transfer;

receiving the credit transfer that is returned, wherein the credit transfer that is returned comprises a return reason code;

processing the return reason code and identifying the routing and account numbers of the credit transfer that is returned; and updating the predetermined table with the routing and account numbers of the credit transfer that is returned.

19. The computer-readable storage device of claim 18, wherein forwarding the credit transfer to the wire transfer service further comprises forwarding the credit transfer to the wire transfer service when the comparison of the routing and account numbers with the predetermined table does identify that the routing and account numbers are inoperable for posting the credit to the RDFI via the ACH but does not identify that the routing and account numbers are inoperable for posting the credit to the RDFI via the wire transfer service.

20. The computer-readable storage device of claim 18, the method further comprising reformatting the credit transfer to a return format item when the comparison of the routing and account numbers with the predetermined table identifies that the routing and account numbers are inoperable for posting the credit to the RDFI via the ACH and are inoperable for posting the credit to the RDFI via the wire transfer service; and returning the return format item to the foreign originator.

* * * * *